(12) United States Patent
Schwerdtner

(10) Patent No.: US 7,969,633 B2
(45) Date of Patent: Jun. 28, 2011

(54) METHOD AND DEVICE FOR COMPUTING COMPUTER-GENERATED VIDEO HOLOGRAMS

(75) Inventor: Armin Schwerdtner, Dresden (DE)

(73) Assignee: SeeReal Technologies GmbH, Dresden (DE)

( * ) Notice: Subject to any disclaimer, the term of this patent is extended or adjusted under 35 U.S.C. 154(b) by 0 days.

(21) Appl. No.: 12/534,317

(22) Filed: Aug. 3, 2009

(65) Prior Publication Data

US 2009/0290203 A1   Nov. 26, 2009

Related U.S. Application Data

(62) Division of application No. 11/313,977, filed on Dec. 21, 2005, now Pat. No. 7,636,184.

(30) Foreign Application Priority Data

Dec. 23, 2004 (DE) .......................... 10 2004 063838

(51) Int. Cl.
*G03H 1/08* (2006.01)
*G03H 1/16* (2006.01)
(52) U.S. Cl. ............................................. 359/9; 359/29
(58) Field of Classification Search ........................ 359/9
See application file for complete search history.

(56) References Cited

U.S. PATENT DOCUMENTS

| | | | |
|---|---|---|---|
| 5,400,155 A | 3/1995 | Ueda et al. | |
| 5,974,178 A | 10/1999 | Kitayoshi | |
| 6,545,790 B2 | 4/2003 | Gerchberg | |
| 6,621,605 B1 | 9/2003 | Grossetie et al. | |
| 6,791,570 B1 | 9/2004 | Schwerdtner et al. | |
| 7,307,767 B2 * | 12/2007 | Gerspach et al. | 359/9 |
| 7,315,408 B2 | 1/2008 | Schwerdtner | |
| 7,400,431 B2 | 7/2008 | Schwerdtner et al. | |

(Continued)

FOREIGN PATENT DOCUMENTS

| | | |
|---|---|---|
| EP | 0 593 300 | 4/1994 |
| WO | WO 00/34834 | 6/2000 |

(Continued)

OTHER PUBLICATIONS

Ichioka Y et al. "Scanning Halftone Plotter and Computer-Generated Continuous-Tone Hologram" Applied Optics, OSA, Optical Society of America, Washington, DC, US, vol. 10 No. 2, pp. 403-411(Feb. 1, 1971).

(Continued)

*Primary Examiner* — Stephone B Allen
*Assistant Examiner* — Jade R Chwasz
(74) *Attorney, Agent, or Firm* — Saul Ewing LLP

(57) ABSTRACT

The data defining an object to be holographically reconstructed is first arranged into a number of virtual section layers, each layer defining a two-dimensional object data sets, such that a video hologram data set can be calculated from some or all of these two-dimensional object data sets. The first step is to transform each two-dimensional object data set to a two-dimensional wave field distribution. This wave field distribution is calculated for a virtual observer window in a reference layer at a finite distance from the video hologram layer. Next, the calculated two-dimensional wave field distributions for the virtual observer window, for all two-dimensional object data sets of section layers, are added to define an aggregated observer window data set. Then, the aggregated observer window data set is transformed from the reference layer to the video hologram layer, to generate the video hologram data set for the computer-generated video hologram.

17 Claims, 5 Drawing Sheets

U.S. PATENT DOCUMENTS

| | | |
|---|---|---|
| 2002/0008887 A1 | 1/2002 | Horikoshi et al. |
| 2002/0122254 A1 | 9/2002 | Gluckstad |
| 2003/0122837 A1* | 7/2003 | Saxena et al. ............ 345/566 |
| 2003/0151784 A1 | 8/2003 | Kitamura et al. |
| 2004/0021768 A1 | 2/2004 | Payne et al. |

FOREIGN PATENT DOCUMENTS

| | | |
|---|---|---|
| WO | WO 03/021363 | 3/2003 |
| WO | WO 03/025680 | 3/2003 |
| WO | WO 2004/044659 | 5/2004 |

OTHER PUBLICATIONS

Ferri L. C. "Visualization of 3D information with digital holography using laser printers" Computer and Graphics, Pergamon Press Ltd., Ocford, GB, vol. 25, No. 2, pp. 309-321 (Apr. 2001).

Haist T et al. "Computer-generated holograms from 3D-objects written on twisted-nematic liquid crystal displays" Optics Communications, North-Holland, Publishing Co. Amsterdam, NL, vol. 140, No. 4-6, pp. 299-308 (Aug. 1, 1997).

* cited by examiner

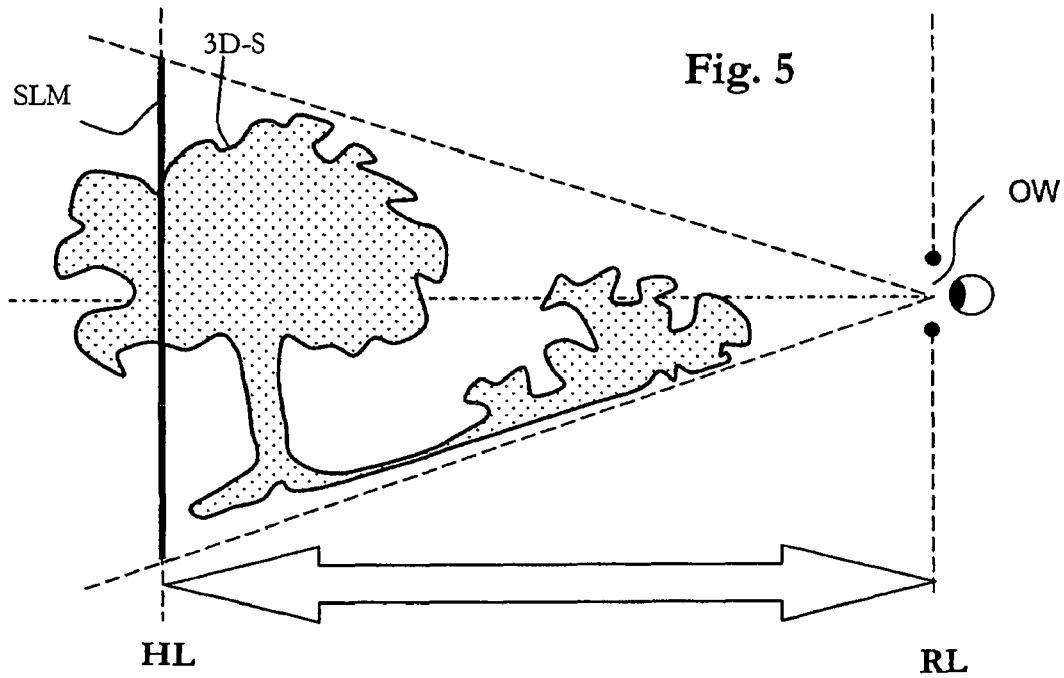
Fig. 5
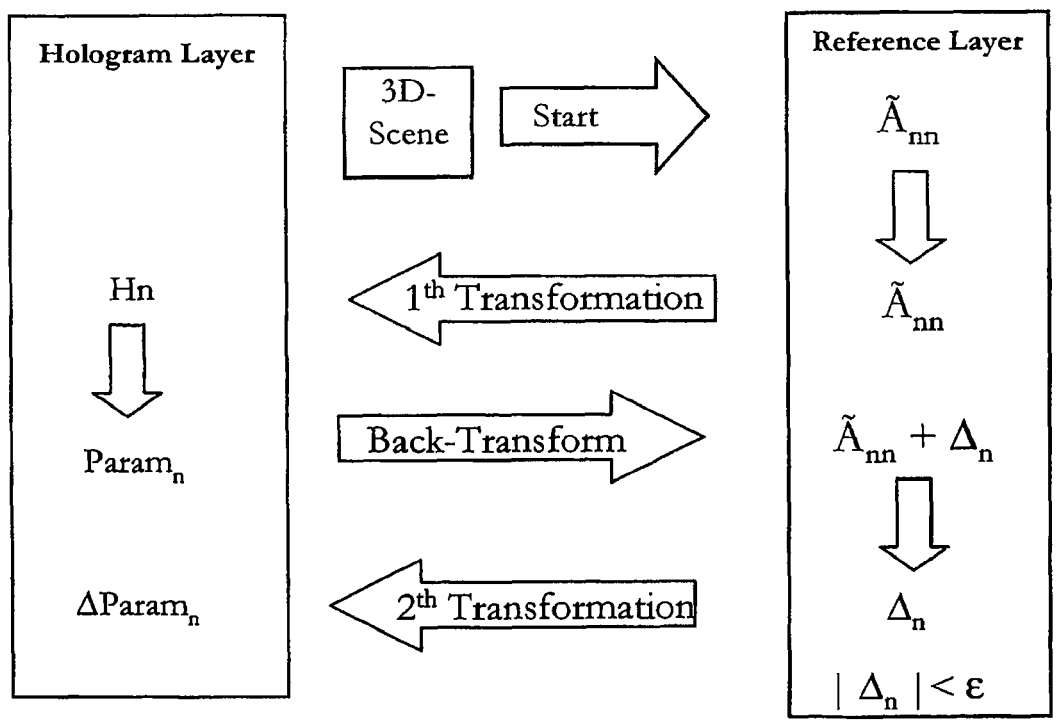

METHOD AND DEVICE FOR COMPUTING COMPUTER-GENERATED VIDEO HOLOGRAMS

CROSS-REFERENCE TO RELATED APPLICATIONS

This application is a divisional of co-pending U.S. application Ser. No. 11/313,977, filed Dec. 21, 2005, which claims priority to German Application No. DE 10 2004 063838, filed on Dec. 23, 2004, the entire contents of which are hereby incorporated in total by reference.

BACKGROUND OF THE INVENTION

1. Field of the Invention

The present invention relates to a method and device for computing computer-generated holograms (CGH), especially real-time or near real-time holograms, e.g. video holograms, which are made up of individually controllable hologram cells; each cell displays complex-valued data. Besides stills, real-time video holograms are of particular interest. Electro-holography aims at a realization of CGH in real-time. The electro-hologram display is effectively a Spatial Light Modulator (SLM) with controllable pixels reconstructing object points by spatial modulating an illuminating light. Throughout this specification, we will refer to real-time holograms as video holograms. For those skilled in the art, video holograms also cover Optically Addressable SLMs, Acousto-Optic light Modulators (AOM) or the like which do not exhibit separately arranged cells.

In contrast to classic holograms, which are stored photographically or in another suitable way in the form of interference patterns, video holograms exist as a result of a computation of discrete hologram data from sequences of a three-dimensional scene. During the computation process, the intermediate data is stored, for example, by electronic means, such as an electronic storage medium of a computer, graphics processor, graphics adapter or other hardware component. The 3D scene data can be generated in any way, e.g. by interference patterns or 3D conversion of 2D data.

2. Background Concepts

Spatial Light Modulators (SLMs) are devices for spatially controlling the complex-valued data, i.e. the magnitude and phase of the amplitude of each color component of light. The color can be encoded by being spatially or temporally multiplexed. The SLM may contain controllable hologram cells, each being separately addressed and controlled by a discrete value set of a hologram data. SLMs can also be continuous and not contain discrete cells. To achieve color encoding by spatial multiplexing in a cell based SLM, each pixel in a cell may comprise color sub-pixels, each sub-pixel displaying one of three or more primary colors. Depending on the kind of video hologram encoding used, further sub-pixels may be used for encoding each of the primary colors. For instance, a detour phase encoding, like the known Burckhardt encoding, needs an arrangement of three sub-pixels for each color component. Taking into account three color components, the number of sub pixels totals to nine for a hologram cell (i.e. there are three primary colors; there are three sub-pixels for each of these three primary colours, making nine sub-pixels in total. In contrast, the also known Lee encoding requires four sub pixels; and a two-phase encoding requires two sub pixels for each color in a hologram cell.

Each hologram cell is encoded by one discrete set of hologram data containing at least amplitude and phase information of a given color component; said data may be zero or have a standard value or may be arbitrarily chosen. The hologram data of a video hologram is continuously updated according to the scheme driving the SLM. Since the entire hologram is made up of thousands of cells, there are thousands of discrete sets of hologram data.

A hologram data set contains all the information necessary to encode one single video hologram cell as part of a time sequence to reconstruct a three-dimensional scene.

A dedicated driver uses the discrete hologram data sets to provide the specific control signals for controlling the corresponding sub-pixels of the SLM. The driver and the provision of control signals are specific to the type of the SLM used and is not the subject of this invention. Many kinds of SLMs, like transmissive or reflective liquid crystal displays, micro optical and electro mechanical micro systems or continuously optically addressed SLMs and acousto optic modulators can be used in combination with this invention.

The modulated light emerges from the hologram with the amplitude and phase appropriately controlled and propagates through the free space towards the observer in the form of a light wave front, to reconstruct a three-dimensional scene. Encoding the SLM with the hologram data set causes the wave field emitted from the display to reconstruct the three-dimensional scene as desired by creating interferences in the viewing space.

The present invention provides real-time or near real-time control data for each hologram cell for the required wave modulation by computing amplitude and/or phase for a given wavelength.

3. Description of Related Art

A common problem in reconstructing three-dimensional scenes is the low pixel resolution and low pixel count currently feasible with conventional SLMs. For reconstructing 20 inch wide SLMs available today a pixel pitch about 1 μm-would be required check meaning. Taking into account three sub pixels for encoding each of the three primary color components in a hologram cell, —more than $10^9$ pixels would be necessary. This requires costly hardware and high computational speed for calculating the video hologram. Affordable real-time displays and devices with fast enough computational speed which meet these demands are currently not commercially available.

For computing video holograms it is not necessary for 3D scenes to have existed in reality. This enables reconstruction of virtual 3D scenes in various fields of applications, such as technology, entertainment and advertising, where moving three-dimensional scenes are synthesized and edited by computer.

Computer-generated video holograms can, for example, be reconstructed using a holographic display as described by the applicant in document WO 2004/044659, the contents of which are incorporated by reference. The viewer looks towards the display screen through at least one virtual observer window, which is greater than an eye pupil. The observer windows are located near the viewer's eyes and can be tracked to follow the viewer's position with the help of known position detection and tracking devices. The image plane of the light sources is the Fourier plane of the hologram. As the observer window is part of the Fourier plane of the hologram, it is on the image plane of the light source.

The observer windows can therefore preferably be limited to a size just a little larger than the size of the eye pupils. This greatly reduces the requirements on the pixel resolution and pixel count of the SLM and reduces the computational load. Consequently, the data transfer rate and the required computing power can be reduced and a light modulator matrix with low resolution can be used. One disadvantage of the encoding technique described in this application is that it is based on a computationally intensive operations performed on every single point in the object to be reconstructed.

Video holograms which are computed according to this invention can be reconstructed for example using pixel arrays of about 3 million pixels.

WO 03/025680 discloses a method for computing a video hologram with a restricted grayscale range for representation. A target hologram is divided into partial holograms and their individual reconstructions are used for iteratively computing optimized sub-holograms, thus reducing the required computing power. The iteration process is repeated until the sub-holograms with a small grayscale range can be composed to form a total hologram with an accordingly small grayscale range. In order to convert the serial processing into computational steps which can be carried out simultaneously, separate reconstructions of each sub-hologram are optimized independently of each other until the desired result is achieved for the total hologram. After having generated a target wave front for each data set, the sub-holograms are composed. However, although parallel processing when computing the optimized sub-holograms increases the processing speed, the required computing power is not reduced.

WO 00/34834 discloses a method for calculating three-dimensional scenes and for their real-time reconstruction from digital image data using LCDs. The image data describe a real or virtual three-dimensional scene by their intensity distribution in space. The main steps are: dividing a 3D scene into several parallel section layers (slicing) with respective section boundaries of the scene, computing a section hologram for each section layer, and sequentially reconstructing the computed section holograms using a light modulator matrix. For each section hologram, the given two-dimensional image defined by an intensity distribution is transformed into a two-dimensional intermediate image defined by a complex function. The resolution of the three-dimensional reconstruction is increased by way of over sampling over sampling the images. Then, a fictive diffraction image is computed for each scene section in a reference layer situated at a distance to the section layers, and the diffraction image is superimposed by a complex reference wave. This results in expressions of two-dimensional holograms in the form of interference patterns for the reference layer, said patterns providing discrete control values for a driver to encode the light modulator matrix. The light modulator matrix is situated in the reference layer with this prior art solution.

The diffraction images of the section layers are computed by multiplying the complex pixel amplitude values and the mathematical expression of a spherical wave according to the distance between this section layer and reference layer, and integration over all pixels of the scene section (slice). This integral is interpreted as a convolution integral and evaluated by computing the product of the Fourier transform of the factors and subsequent back-transformation.

A disadvantage is that real-time sequential reconstruction of each section layer requires extremely fast computing means and a light modulator matrix which is capable of reconstructing several hundreds of section holograms per second. Moreover, the three-dimensional scene is reconstructed behind the reference layer. This means that a viewer sees the 3D scene behind the light modulator matrix, or inside the hologram display.

Because a proper reconstruction of the depth of a scene involves more than 100 section layers, this solution requires an extremely high refresh rate of the display screen. A satisfactory and natural real-time reconstruction of moving three-dimensional scenes using known computing and displaying means is not expected due to the low speeds and the fact that the reconstruction is restricted to the interior of the hologram display.

SUMMARY OF THE INVENTION

The object of this invention is to provide a method for speeding up computation of computer-generated video holograms, said video holograms allowing simultaneous reconstruction of a three-dimensional scene while maintaining the spatial resolution and reconstruction quality. This invention enables interactive real-time or near real-time reconstructions of given video holograms and transfer means. Another object is to provide a method that allows large computer generated holographic reconstructions to be generated; these can be as large as, and also larger than, the hologram itself.

This object is achieved by a method for computing a computer-generated video hologram, where object data defining objects in a three dimensional scene is arranged into a number of virtual section layers, each layer defining a two-dimensional object data set, such that a video hologram data set can be calculated from some or all of these two-dimensional object data sets; comprising the following steps:

(a) in a first transformation, each two-dimensional object data set of the virtual section layers is transformed to a two-dimensional wave field distribution, and the wave field distribution is calculated for a virtual observer window in a reference layer at a finite distance from the video hologram layer, (b) the calculated two-dimensional wave field distributions for the virtual observer window, for all two-dimensional object data sets of section layers, are added to define an aggregated observer window data set;

(c) in a second transformation, the aggregated observer window data set is transformed from the reference layer to the video hologram layer, to generate the video hologram data set for the computer-generated video hologram.

The object data defining a three dimensional scene can be data defining a two dimensional scene, but including additional depth information for converting two dimensional image or video data to three dimensional data. The term 'three dimensional' includes within its scope 'two dimensional'. The depth information may be the same for all object data sets. Hence, the device that generates the hologram can switch from a three dimensional mode to a two dimensional mode, depending on the inputs and also what the user wishes to display.

The term 'layers' should be expansively construed to cover any kind of virtual definable structure that can describe the points that constitute the scene that is reconstructed. It therefore includes any set of virtual parallel surfaces, and any algorithm that can spatially define these points. However, virtual planar sections are computationally the most efficient form of layer to handle.

The term 'plane' should be expansively construed to include a non-planar surface. The reference plane may coincide with the Fourier plane of the hologram (which is the same as the image plane of the illuminating light source); however, there is a degree of tolerance and an observer's eyes placed sufficiently close to the Fourier plane will see a properly reconstructed scene. The degree of tolerance increases as the pixel count increases.

In one implementation, the first transformation is a Fresnel transform and the second transformation is a Fourier transform. The term 'transformation' should be expansively construed to include any mathematical or computational technique that is equivalent or approximates to a transformation. Transformations used in the normal, mathematical sense are merely approximations to physical processes more accurately described by Maxwellian wave propagation equations; transforms such as Fresnel transforms (or the special class of Fresnel transforms known as Fourier transforms) are second order approximations, but have considerable advantage: because they are algebraic as opposed to differential, they can be handled in a computationally efficient manner.

In order to compensate for errors of the reconstructed aggregate field in the observer window, an iteration process may take place between the distribution in the observer window and the hologram layer.

In order to reduce speckle noise, and enhance brightness or diffraction efficiency and brightness definition in the reference layer of the scene, the object data sets may exhibit an appropriate phase distribution, e.g. a pseudo-random phase distribution.

In contrast to prior art solutions, by performing the first two of the above steps according to this invention the hologram of a single aggregated wave field is calculated using a diffraction formulae. Because of the superposition of all individual wave fields, this aggregated wave field contains the entire optical information about the three-dimensional scene within the achieved accuracy.

In a preferred embodiment of this invention all object data sets for the section layers are assigned the same total number of discrete matrix points. If the number of matrix points is identical to the number of scanning points in the hologram, fast algorithms can preferably be used for the entire computing process, and processing steps to adapt the resolution to the respective layer, such as interpolation or over sampling, become superfluous. The number of matrix points for all layers results from the number of encoded pixels of the SLM in the hologram display.

A major advantage of the invention in combination with the video hologram display known from WO 2004/044659 is that before transforming the reference data set for the aggregated wave field in the hologram layer, the area of the observer window(s) in the reference layer can be restricted so that it is considerably smaller than the area of the SLM light modulator matrix. The extent of the observer window maximally corresponds with the periodicity interval in the layer which contains the image of the light source used for reconstruction, when reconstructing the hologram in the reference layer. This leads to the effect that the computer-generated video hologram according to this invention only needs to realize lower diffraction angles compared with other solutions, all the more if the data sets for the reference layer and for the hologram layer have the same number of matrix point values. Thanks to the computation of amplitude values for the light modulator matrix, the demands on processing speed are greatly reduced. In particular, in conjunction with a known position detection and tracking device for tracking the current viewer position, the dimension of the observer window can be greatly minimized to benefit from this advantage. Further, WO 2004/044659, as noted earlier, requires computationally intensive operations performed on every single point in the scene to be reconstructed. With the present invention, it is no longer necessary to perform a computationally intensive operation on every single object point; instead, the first transformation (from each section layer to the virtual observer window in the reference plane—where the observer's eyes will be) is performed on entire section layers, rather than each individual object points in a layer. The second transformation going back from the virtual observer window to the hologram layer is even more efficient since it is just a single operation, yet encodes information for all object points.

In a further embodiment of this invention, each object data set of the section layers is based on a virtual area size which depends on its distance to the reference layer. The section layer areas result from imaginary faces running from the edges of the respective observer window to the edges of the SLM of the video hologram. Because of the same number of matrix point values in each data set, the area assigned to the individual matrix points changes in proportion to the distance to the reference layer. Assigning the original object data to the object data sets of the section layers that is also known as slicing, leads to assigning the discrete object point values of the scene to a respective matrix point of a two-dimensional coordinate system that describes the matrix points on the respective section layer. According to the local position of the object points with respect to the section layers, the original object information is thereby assigned to the matrix points of the coordinate system which is closest to their spatial position. The distance-dependent areas of the section layers thus lead to the effect that the area-dependent object point resolution to describe a section layer of a scene is larger the closer the section layer is situated to the reference layer. This means that while the foreground of a scene is reconstructed in detail, the same scene element in the background would be reconstructed at a much lower resolution. However, the more distant virtual section layers can reconstruct a much larger viewing area for the background of the scene. This kind of reconstruction of a scene provides a very natural representation of foreground and background elements of a scene on the one hand and helps minimizing the required computing power on the other.

In a preferred embodiment of this invention, the value for the distance of each object data set of the virtual section layers can be chosen or changed before transformation so that the entire reconstruction or parts of it appear in front of or behind the hologram layer. This way, both a natural position of the reconstruction in the depth of the space in front of the viewer's eyes and a deliberate amplification or reduction of the depth effect of a synthetic video hologram can be realized through software settings alone.

When encoding according to the prior art method known from WO 2004/044659, the reconstructed three-dimensional scene appears in the free space in front of the viewer's eyes in the form of a wave field controlled by the light modulator matrix. The imaginary section layers used for computing also define the position of the reconstruction in the space in front of the observer windows and are situated at a finite distance to the reference layer. According to the conditions prevailing in an optical near field, this causes the light contribution of each light point, of the holographically reconstructed scene to the aggregated wave field, to propagate as a spherical wave to provide a contribution to the target wave front in the observer window in the reference layer. The transformation of each object data set in the reference layer can thus be expressed with adequate approximation by a Fresnel transform. For this, the amplitude values of all object points of all object data sets are multiplied with a Fresnel phase factor, which depends on the distance of the respective section layer to the reference layer.

The Fresnel phase factor has an exponent which depends on the squared difference of the coordinates between each original section layer and reference layer and other factors. Much processing time and computing power are thus required to perform the many Fresnel transformations. According to a preferred embodiment of this invention, this disadvantage is compensated by dividing the difficult Fresnel transformations into individual steps so that these steps can be performed with the help of fast Fourier transformations (FFT) in conjunction with further processing steps in the form of multiplications with spherical wave factors. This method has the advantage that dedicated electronic hardware such as graphics and/or holography adapters can be used for computing video holograms. Such hardware includes at least one dedicated graphics processor with known modules for slicing and other video processing steps, such as image rendering, and at least one specific processor module for performing the Fresnel transformations with the help of fast Fourier transformation routines. Such processors in the form of digital signal processors (DSP) with the required FFT routines can be made inexpensively using known methods. Recent advantages in common graphics processors enable operations such as Fourier transforming the data of the section layers into the reference layer using so called shading algorithms.

In order to simplify the computation of the wave fields, the transformation which describes the propagation of light between the original section layer and the reference layer is modified such that it comprises a Fast Fourier Transformation (FFT) and two multiplications with phase factors describing spherical waves. The first phase factor depends on the coordinates in the original section layer and on the distance between original section layer and reference layer. The second phase factor depends on the coordinates in the reference layer and on the distance between the original section layer and the reference layer. Depending on the collimation of light in the optical system one or both of these phase factors may be set to a constant value.

Thus, the procedure of transforming the distribution of the section layer into the reference layer can be broken into three steps:

1. The amplitude of each object point is multiplied by the first phase factor.
2. The thus generated products are used for a first Fast Fourier Transformation in order to transform the complex light amplitude of each object point from the original section layer to the reference layer.
3. The thus generated transform is multiplied with the second phase factor.

The transform of the reference data set into the hologram layer, in order to generate a hologram data set for the aggregated video hologram of the scene, can also be expressed by a transformation describing the light wave propagation by a Fresnel transform. In order to be able to perform this step, the transformation is carried out according to the steps described above, but before this transformation, the reference data for all section layers in the reference layer are superimposed by way of a complex addition. Also for this Fresnel transform one or both of the phase factors may be set to a constant value, depending on the collimation of light in the optical system.

A particular advantage of this invention is that a reference data set for an aggregated wave field is generated by adding the computed reference data sets of all section layers. After the transformation in the hologram layer, this aggregated wave field serves as a basis for the video hologram as it contains the entire three-dimensional scene information. This allows simultaneous reconstruction of the two-dimensional images of all section layers and thus the entire 3D scene.

Another advantage arises when one wants to reduce common errors in the video hologram caused by the encoding process or by technological limits. For reducing the reconstruction errors of the video hologram an iteration process may be used. In the prior art, the object data of a reconstructed three-dimensional scene has to be compared with the original three-dimensional object scene. A complicated iteration process comprising many transformations between the reconstructed three-dimensional object scene and the hologram layer takes place until a desired reconstruction quality is reached. Our approach advantageously allows a much simpler iteration process. As the reference data set contains the entire object information, the iteration process comprises transformations between the hologram layer and the reference layer which is only two-dimensional.

High-quality reconstructions with today's image rendering technologies are just not possible without such correction processes.

The video holograms are preferably computed with the help of a digital signal processing device with slicer means, which assigns the object information, including discrete object values for spatial distribution of the light amplitudes of a real or virtual three-dimensional scene, with matrix points of parallel virtual section layers, so that for each section layer, a separate object data set with object points in discrete matrix points of the tomographic scene section layer is defined. A hologram data set of a video hologram is computed from these object data sets. According to this invention the signal processing device further comprises:

First transformation means for computing from each object data set a separate two-dimensional distribution of a wave field for the reference layer situated at a finite distance, and buffer memory means for layer-wise buffering the transformed object data sets, Adding means for adding the transformed object data sets to generate an expression of an aggregated wave field in a reference data set, and Second transformation means for transforming the reference (aggregated) data set in a hologram layer situated at a finite distance and parallel to the reference layer, to generate the hologram data set for an aggregated video hologram of the scene.

The digital signal processing device comprises at least one independently acting transformation means for performing the Fresnel transformations, said transformation means containing:

(a) First multiplication means for multiplying the amplitude value of matrix point values of an original data set with a first phase factor describing spherical waves, the exponent of said factor depending on the squared coordinates in the respective original layer ($L_m$ or RL) and the distance ($D_m$) to a target layer (RL or HL), (b) Fast Fourier transformation means for transforming the products of the first multiplication means from their original sectional layer to the target layer, and (c) Second multiplication means for multiplying that transform with another phase factor describing spherical waves, the exponent of said factor depending on the squared coordinates in the target layer and the distance between target layer and original layer.

As mentioned before, depending on the collimation of light in the optical system one or both of these phase factors may be set to a constant value.

The digital signal processing device can be a multi-processor which has several independently working sub-processors which simultaneously execute transformation routines (TR1, TR2). In order to be able to simultaneously execute at least a certain number of transformations, a resource manager is required which dynamically assigns the transformations required for computation to the available transformation routines depending on the content of the three-dimensional scene. The data sets transformed in the reference layer are buffered in buffer memory means.

This way, depending on the scene content, the data sets can be activated at various points of time and even used several times if no changes occur during scene motion in certain section layers.

For the execution of the Fast Fourier transformation, the object data sets of the virtual section layers are assigned a number N of discrete object point values, said number N being an nth power of 2.

BRIEF DESCRIPTION OF THE DRAWINGS

The functional principle according to the invention is described below in detail with the help of a preferred embodiment and accompanying drawings.

FIG. 5 illustrates the sub-steps executed to correct the matrix point values of the computer-generated hologram.

DETAILED DESCRIPTION OF THE INVENTION

The computation of video holograms with a hologram processor is based on original object information of a real or virtual three-dimensional scene, including values for spatial distribution of the light amplitudes in an RGB or RGB-compatible format. These values are available in a known file format and can be called up from a data memory by a hologram processor. This object information contains for example, in the case of an object point file format BMP for each discrete object point of the three-dimensional scene, a set of complex color object point data $R_o$, $G_o$, $B_o$ for the respective two-dimensional coordinates. The data memory MEM also provides depth information $z_o$ of the three-dimensional scene. It is irrelevant for the depth information $z_o$ for each point whether it is already provided in the first video image file or whether it is computed by the processor from at least one second file containing additional information.

To facilitate understanding of the complex processes, one of the three spatial coordinates (here, the y coordinate) will be neglected in the following description. The assignment of object points of the scene to matrix points $P_{11} \ldots P_{MN}$ in M section layers $L_1 \ldots L_M$ produces object data sets $OS_1 \ldots OS_M$ with N matrix point values. All data sets contain the same number N of matrix point values. This number N is determined by the number of pixels N1 of the light modulator matrix which can represent N1 complex values. If a Fast-Fourier Transform algorithm is used for calculation of the Fourier transform, N has to be reduced to a power of 2, i.e. $N=2^n$ with n being an integer number and $N \leq N1$. E.g. for a display with N1=1280 pixels each data set contains N=1024 matrix point values. However, other Fourier Transform algorithms may be used which do not require $2^n$ input values and hence the whole display resolution N1 could be used.

Figure 1:
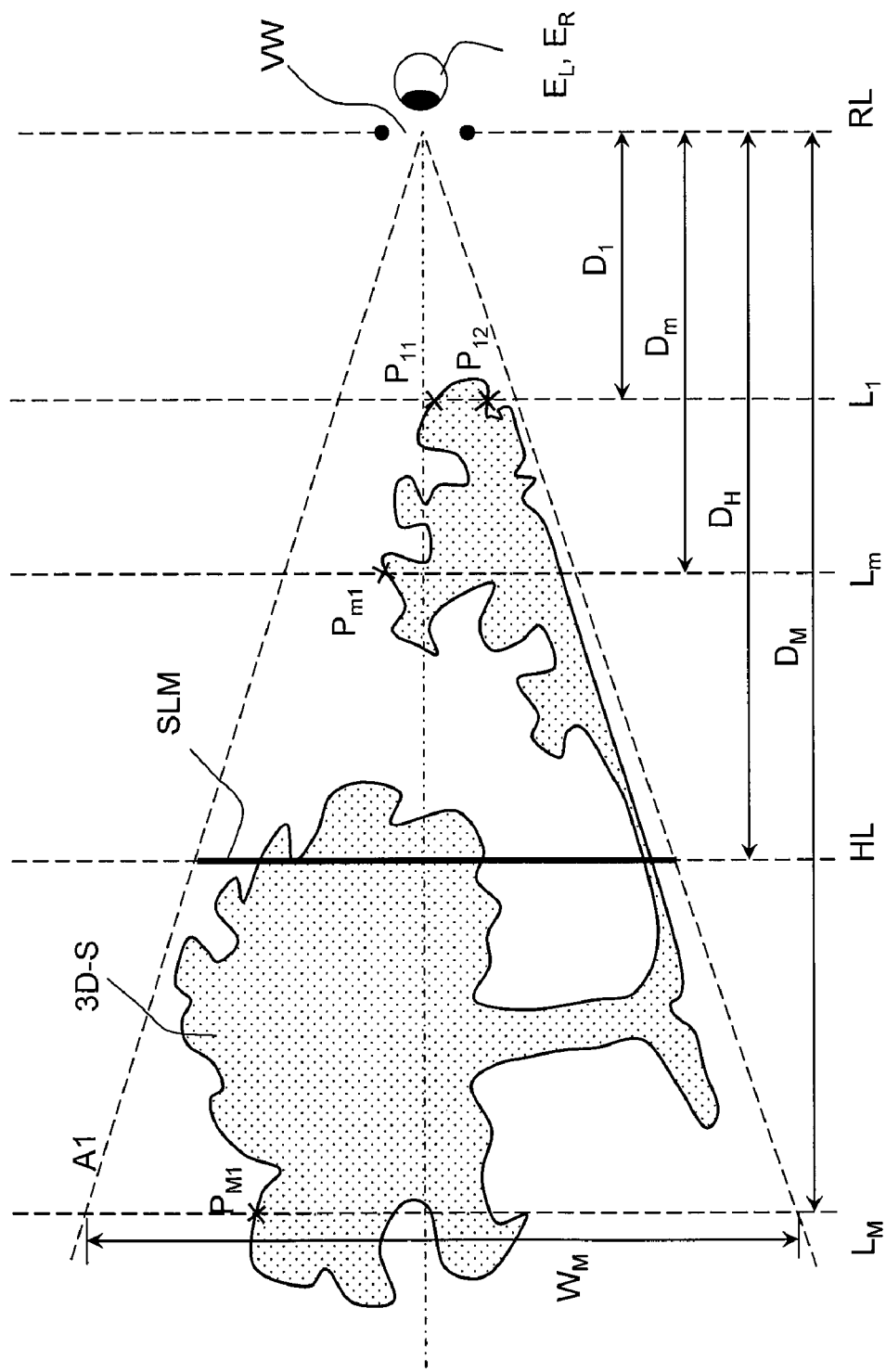
FIG. 1 shows (not to scale) the arrangement for reconstructing the three-dimensional scene and the reference layers required for the computation of video holograms.
Figure 2:
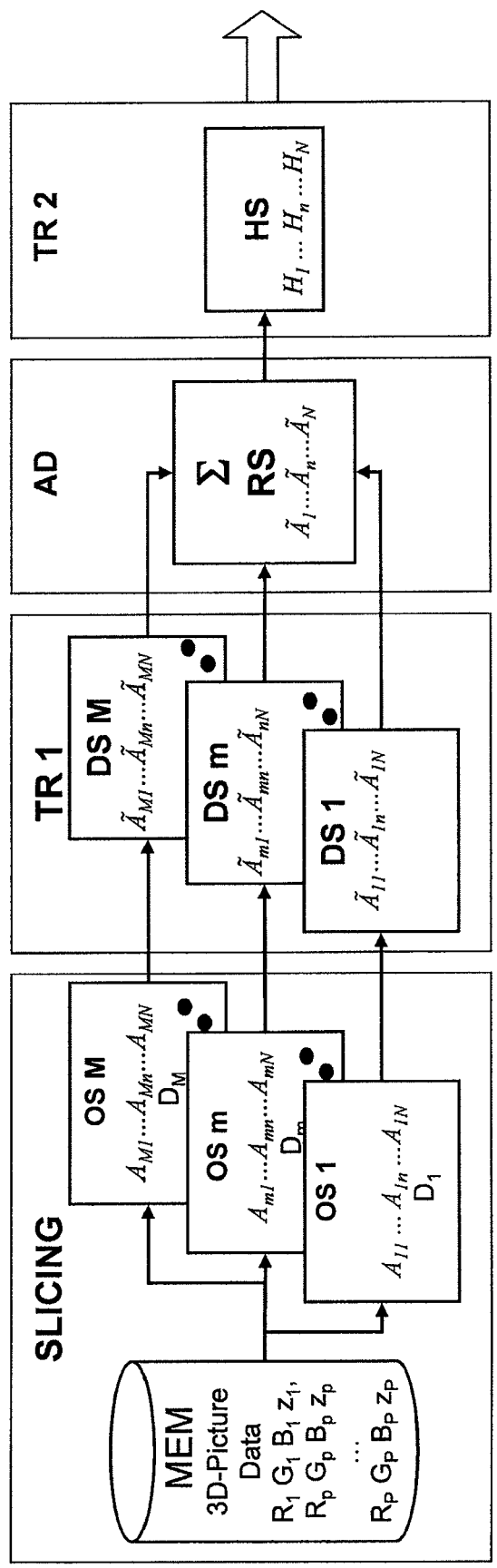
FIG. 2 is a schematic diagram showing the signal processing device for computing video holograms according to this invention.

Seen in conjunction with FIG. 2, FIG. 1 shows a preferred embodiment and illustrates how the scene is divided into a number M of virtual section layers $L_1 \ldots L_M$ for computation by a slicer shown in FIG. 2. The slicer analyses in a known manner the depth information z of the original object information stored in the data memory MEM, assigns each object point of the scene with a matrix point $P_{mn}$, and enters according matrix point values in an object data set $OS_m$ corresponding with the section layer $L_m$. For the indices, $0 \leq m \leq M$, and $1 \leq n \leq N$, where N is the number of matrix points P in each layer and the number of matrix point values in a data set. On the one hand, the section layers $L_1 \ldots L_M$ are defined arbitrarily to determine discrete object data sets of the scene, irrespective of whether or not the scene exists in reality. On the other hand, the same section layers $L_1 \ldots L_M$ aim to define the spatial position of the reconstructed scene 3D-S with respect to the video hologram. FIGS. 1 and 2 therefore show the desired reconstruction 3D-S of the scene as defined locally with respect to the video hologram. Further definitions are necessary to be able to perform the computations: each section layer $L_m$ is situated at a distance $D_m$ to a reference layer RL which has a observer window OW near which there are the viewer's eye(s) $E_L/E_R$. The video hologram is disposed in a hologram layer HL which is situated at a distance $D_H$ to the reference layer.

As shown in FIG. 2, the computation of the hologram matrix is continued by performing the following steps:

(a) Transformation of the object data sets $OS_1$. $OS_M$ of the section layers $L_1 \ldots L_M$ in the reference layer RL so to determine the wave field which would generate the complex amplitudes $A_{11} \ldots A_{MN}$ of the object points of each section layer Lm as a contribution to the aggregated wave field in the reference layer RL, if the scene was existent there.

(b) Addition of the transformed object data sets $DS_1 \ldots DS_M$ with the components $Ã_n$ to form a reference data set RS that defines an aggregated wave field which is to appear in the observer window OW when the scene is reconstructed.

(c) Back-transformation of the reference data set RS from the reference layer RL to form a hologram data set HS in the hologram layer HL situated at a distance of $D_H$ to get matrix point values $H_1 \ldots H_n \ldots H_N$ for encoding the video hologram.

The N pixel values for the video hologram are derived from the typically complex values of the hologram data set. In the video hologram, these values represent amplitude values and wave phases for modulating the light during scene reconstruction.

It has been described above how 3D-S is reconstructed for the viewer in a observer window OW. In order to be able to perceive three-dimensional scenes in a true three-dimensional manner, as if the object was viewed in reality, different holograms are needed in the respective observer windows for each eye.

The hologram matrix for the second observer window is computed in the same way, but with accordingly altered matrix point values. The alterations result from the different positions of both viewer's eyes with respect to the scene 3D-S. The two hologram matrices can be computed at the same time and absolutely independently of each other in accordingly equipped multi-channel digital signal processors with simultaneously working FFT routines. In order to reduce the required computing power, computation results of object data sets which show only little or no difference in content may be jointly used. This may apply to section layers which show a picture background. Both eyes will then see the same scene, but from slightly offset directions.

According to a particular feature of this invention, the digital signal processing device contains an object data set manager which compares the contents of corresponding object data sets to alternately assign only one of the two identical object data sets to one of the two signal processor channels for transformation and thus avoid superfluous processing.

In contrast to known solutions, the reconstructions are viewed through the virtual observer windows in frustum-shaped spaces which are defined by imaginary connection faces A1 and A2 stretching from the observer windows OW to the light modulator matrix LM. The 3D-S reconstructions may appear in front of, on or behind the video hologram layer HL or intersect this layer.

The observer window size is sufficient if it covers the lateral size of an eye, in special cases even it may be reduced to pupil size. Assuming a observer window of 1×1 cm² disposed at a distance of 1 m to the hologram layer, the number of pixels required for the computer-generated video hologram is reduced by a factor of 2,500 . . . 10,000 compared with a light modulator matrix with classic encoding methods.

Figure 3:
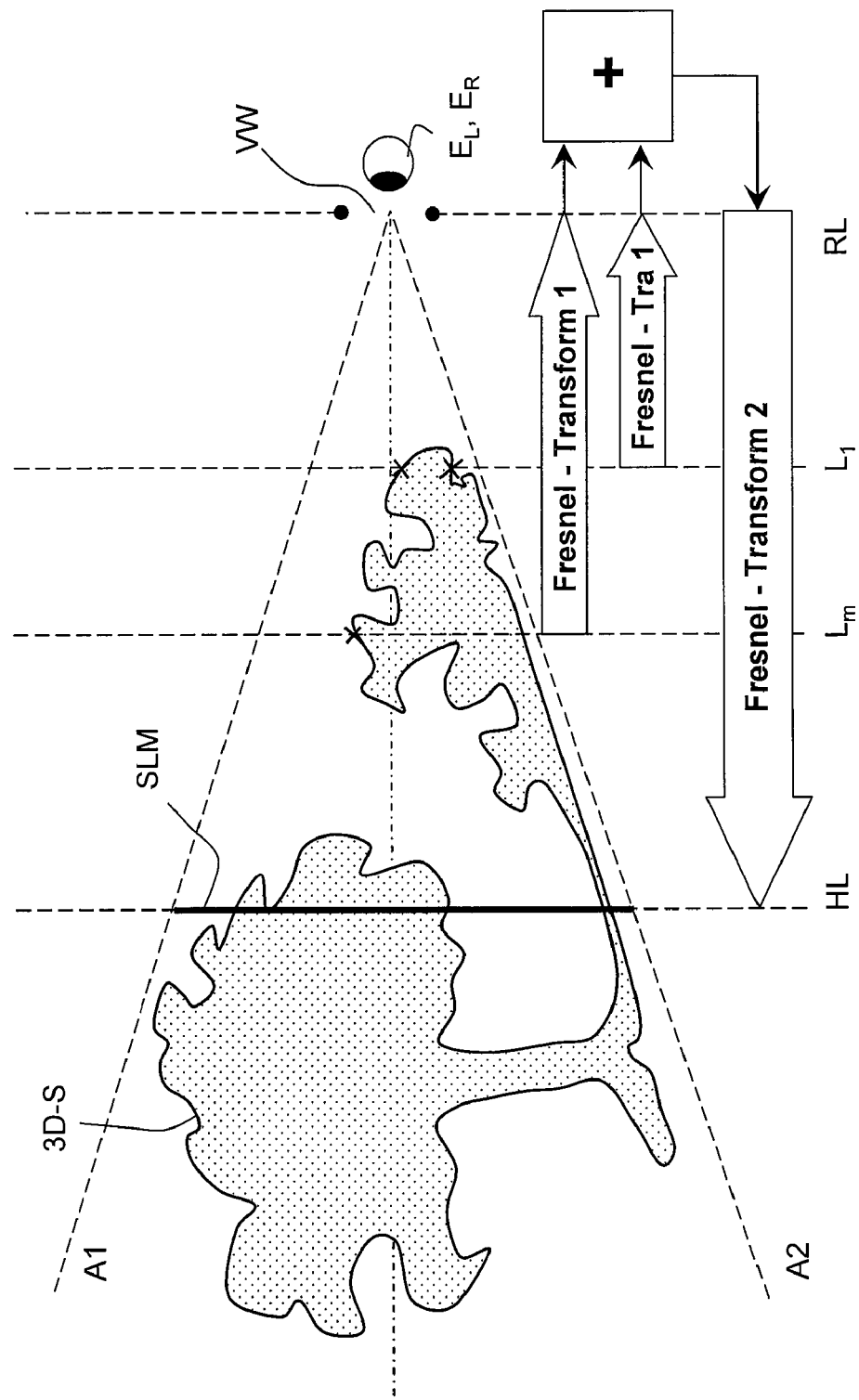
FIG. 3 is similar to FIG. 1 and illustrates the main steps of the computation according to this invention.

FIG. 3 shows the position of selected layers for the execution of the transformations required for the computation. Only the first virtual section layer $L_1$ and one further layer $L_m$ are shown. However, the contribution of all wave fields is always required to compute the wave field of the section layers $L_1 \ldots L_M$ in the reference layer RL. In order to save computing power, when processing moving three-dimensional scenes, individual transformed data sets $DS_1 \ldots DS_M$ can be buffered and re-used for several subsequent video holograms until there occurs a change in content.

Figure 4:
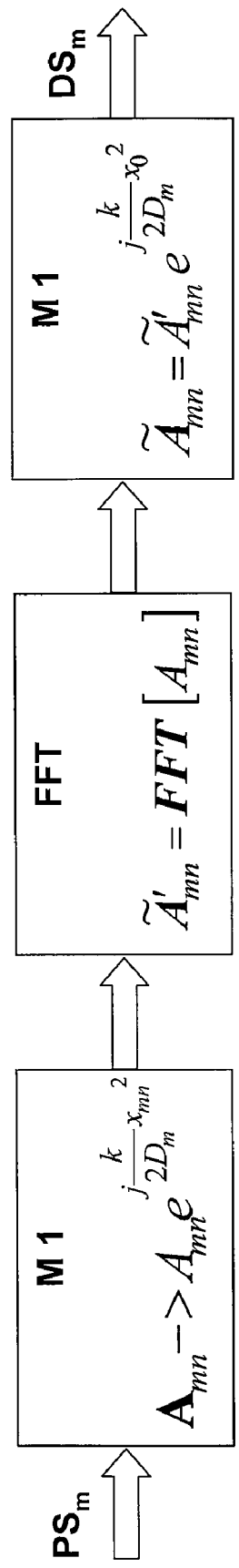
FIG. 4 illustrates the functional principle of the transformation means.

FIG. 4 shows in detail how the amplitude values $A_{m1} \ldots A_{mn} \ldots A_{mN}$ of an object data set $OS_m$ of a section layer $L_m$ at a distance of $D_m$ to the reference layer RL are transformed. To facilitate understanding of this complex process, only a one-dimensional transformation is shown. Equation (1) shows the core of a Fresnel transformation.

$$e^{j\frac{k}{2D_m}(x_m - x_0)^2} = e^{j\frac{k}{2D_m}x_m^2} * e^{-j\frac{k}{D_m}x_m x_0} * e^{j\frac{k}{2D_m}x_0^2} \quad (1)$$

where the term $$e^{-j\frac{k}{D_m}x_m x_0}$$

denotes the core of a Fourier transformation from a layer with the coordinates $x_m$ in a layer with the coordinates $x_0$, i.e. from a section layer situated at a distance of $D_m$ in a reference layer.

As mentioned before, depending on the collimation of light in the optical system one or both of these quadratic phase factors may be 1.

The equation (2)

$$A_{mn} \rightarrow A_{mn} * F1_{mn} = A_{mn} e^{j\frac{k}{2Dm}x_{mn}^2} \quad (2)$$

defines the amplitude $A_{mn}$ of a matrix point value multiplied with the corresponding phase factor $F1_{nm}$ in the layer $L_m$.

Finally, equation (3) shows the result of the Fourier transform of (2) and the multiplication with a phase factor which solely depends on the coordinates $x_0$ of the observer window OW in the reference layer and the distance of the respective section layer to the reference layer. It defines the complex amplitude in a matrix point of the observer window in the reference layer.

$$\tilde{A}_{mn} = \tilde{A}'_{mn} e^{j\frac{k}{2D_m}x_0^2} \quad (3)$$

The described solution allows accelerating the computing process so that a dedicated digital signal processor circuit can perform the computation of a sequence of video holograms of a moving scene for both eyes in the form of a real-time non-flickering reconstruction. In order to compensate for errors of the reconstructed aggregate field in the observer window OW, in a preferred embodiment of the invention an iteration process shown in FIG. 5 can applied for the calculation between the distribution in the observer window OW and the hologram layer HL.

The invention claimed is:

1. Digital signal processing device for computing computer-generated video holograms with digital slicer means, which assigns object data defining objects in a three dimensional scene to a number of virtual section layers, each virtual section layer defining a separate object data set, such that a video hologram data set for a video hologram is calculated from some or all of these object data sets, containing:
   (a) first transformation means for computing from each object data set a separate, two-dimensional wave field distribution for a virtual observer window near which an observer's eye is located in a reference layer situated at a finite distance from a video hologram layer, and buffer memory means for buffering transformed object data sets,
   (b) adding means for adding the transformed object data set of all virtual section layers to generate a wave field expression of an aggregated observer window data set, and
   (c) second transformation means for transforming the aggregated observer window data set from the reference layer to the video hologram layer situated at a finite distance and parallel to the reference layer, to generate the video hologram data set for an aggregated video hologram.

2. Device according to claim 1, which comprises at least one independently working transformation means for performing transformations, said device containing:
   (a) First multiplication means for multiplying the amplitude value of values of an original object data set with a first phase factor describing spherical waves, the exponent of said factor depending on squared coordinates in the respective original layer and the distance to a target layer,
   (b) Fast Fourier transformation means for transforming the products of the first multiplication means from their original layer to the target layer, and
   (c) Second multiplication means for multiplying that transform with another phase factor describing spherical waves, the exponent of said factor depending on squared coordinates in the target layer and the distance between target layer and original layer.

3. Device according to claim 2, where for the execution of the fast Fourier transformations all data sets have a number of discrete matrix point values, said number being an nth power of 2.

4. Device according to claim 1, which includes a multi-channel digital signal processor for independent and simultaneous execution of frequently re-occurring computation routines.

5. Device according to claim 1, which includes a multitude of independently working sub-processors which comprise simultaneously executed transformation routines, and a resource manager which dynamically assigns the transformations required for computation to the available transformation routines depending on the content of the three-dimensional object, in order to be able to simultaneously execute at least a certain number of transformations.

6. Device according to claim 1, which is a multi-channel processor for simultaneous computation of the video hologram data sets for both eyes.

7. Device according to claim 1, which includes object data set controlling means for comparing the contents of corresponding object data sets in hologram computations with different original object data, in order to execute same or similar transformations only once in one of two signal processor channels and to co-use the transforms in the other channel.

8. Device according to claim 1, where one or all of phase factors describing spherical waves may be set to a constant value.

9. Device according to claim 1 adapted to switch from a three dimensional mode to a two dimensional mode, depending on the inputs or what mode a user selects.

10. Video hologram display comprising a light source, a spatial light modulator matrix and imaging means, arranged such that the image plane of the light source by the imaging means is the Fourier plane of the spatial light modulator matrix and wherein a virtual observer window is located completely within one periodicity interval in said Fourier plane, the display further comprising the digital signal processing device defined in claim 1 for computing computer-generated video holograms addressed to the spatial light modulator matrix.

11. Device according to claim 1 adapted to carry out an iteration process between the two-dimensional wave field distribution in the observer window and the hologram layer, in order to compensate for errors of the reconstructed aggregate field in the observer window.

12. Device according to claim 1 adapted to compute the object data sets such that they exhibit an appropriate phase distribution or a pseudo-random phase distribution, in order to reduce speckle noise, and enhance brightness or diffraction efficiency and brightness definition in the reference layer of the scene.

13. Device according to claim 1 adapted to assign all object data sets for the virtual section layers the same total number of discrete matrix points.

14. Device according to claim 1 adapted to perform a first transformation by the first transformation means on entire virtual section layers.

15. Device according to claim 1 adapted such that the value for the distance of each object data set of the virtual section layers is chosen or changed before transformation so that the entire reconstruction or parts of it appear in front of or behind or so that the entire reconstruction or parts of it appear in front of behind the hologram layer.

16. Digital signal processing device for computing computer-generated video holograms with digital slicer means, which assigns object data defining objects in a three dimensional scene to a number of virtual section layers, each virtual section layer defining a separate object data set, such that a video hologram data set for a video hologram is calculated from some or all of these object data sets, containing:
  (a) first transformation means for computing from each object data set a separate, two-dimensional wave field distribution for a virtual observer window near which an observer's eye is located in a reference layer situated at a finite distance from a video hologram layer, and buffer memory means for buffering transformed object data sets,
  (b) adding means for adding the transformed object data of all virtual section layers to generate a wave field expression of an aggregated observer window data set,
  (c) second transformation means for transforming the aggregated observer window data set from the reference layer to the video hologram layer situated at a finite distance and parallel to the reference layer, to generate the video hologram data set for an aggregated video hologram, and
  the video hologram data set being used to encode a spatial light modulator, the spatial light modulator being located in the video hologram layer.

17. Video hologram display comprising a light source, a spatial light modulator matrix and imaging means, arranged such that an image plane of the light source by the imaging means is a Fourier plane of the spatial light modulator matrix and wherein a virtual observer window is located completely within one periodicity interval in said Fourier plane, the display further comprising the digital signal processing device defined in claim 16 for computing computer-generated video holograms addressed to the spatial light modulator matrix.

* * * * *